US012299868B2

(12) United States Patent
Frishman et al.

(10) Patent No.: US 12,299,868 B2
(45) Date of Patent: May 13, 2025

(54) CONTROL OF A MANUFACTURING PROCESS USING CONTOUR CURVATURE ANALYSIS OF SPECIMENS

(71) Applicant: Applied Materials Israel Ltd., Rehovot (IL)

(72) Inventors: Einat Frishman, Rehovot (IL); Ilan Ben-Harush, Tel-Aviv (IL); Rafael Bistritzer, Petach Tikva (IL)

(73) Assignee: Applied Materials Israel Ltd., Rehovot (IL)

( * ) Notice: Subject to any disclaimer, the term of this patent is extended or adjusted under 35 U.S.C. 154(b) by 530 days.

(21) Appl. No.: 17/580,541

(22) Filed: Jan. 20, 2022

(65) Prior Publication Data
US 2023/0230223 A1     Jul. 20, 2023

(51) Int. Cl.
*G06T 7/00*     (2017.01)
*G01B 11/24*     (2006.01)
*G01N 21/95*     (2006.01)
*G06T 7/64*     (2017.01)

(52) U.S. Cl.
CPC .......... *G06T 7/0006* (2013.01); *G01B 11/24* (2013.01); *G01N 21/95* (2013.01); *G06T 7/64* (2017.01); *G06T 2207/30148* (2013.01)

(58) Field of Classification Search
CPC ......... G06T 7/0006; G06T 2207/30148; G06T 2207/10061; G06T 7/64; G01N 21/95; G01N 23/2251; G01N 21/88; G01B 11/24; G01B 15/04; G01B 21/20; G01B 2210/56; G01Q 60/24; H01L 22/12
See application file for complete search history.

(56) References Cited

U.S. PATENT DOCUMENTS

| | | | | |
|---|---|---|---|---|
| 2014/0136137 | A1* | 5/2014 | Tarshish-Shapir | G01N 21/4788 702/108 |
| 2015/0377743 | A1* | 12/2015 | Mawby | G01M 17/02 702/84 |
| 2016/0246285 | A1* | 8/2016 | Veldman | G05B 19/406 |
| 2022/0024134 | A1* | 1/2022 | Hazart | B33Y 50/02 |

* cited by examiner

*Primary Examiner* — Michael P LaPage
(74) *Attorney, Agent, or Firm* — Lowenstein Sandler LLP

(57) ABSTRACT

There is provided a system and a method comprising obtaining data $D_{contour}$ informative of a contour of an element of a semiconductor specimen acquired by an examination tool, using the data $D_{contour}$ to generate a signal informative of a curvature of the contour of the element, determining at least one of data $D_{periodicity}$ informative of a periodicity of the signal, or data $D_{discontinuities}$ informative of a number of discontinuities in the signal, wherein each discontinuity is informative of a transition between a convex portion of the contour and a concave portion of the contour, and using at least one of the data $D_{periodicity}$ or the data $D_{discontinuities}$ to determine data informative of correct manufacturing of the element.

20 Claims, 11 Drawing Sheets

CONTROL OF A MANUFACTURING PROCESS USING CONTOUR CURVATURE ANALYSIS OF SPECIMENS

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter, there is provided a system of examination of a semiconductor specimen, the system comprising a processor and memory circuitry (PMC) configured to obtain data $D_{contour}$ informative of a contour of an element of the semiconductor specimen acquired by an examination tool, use the data $D_{contour}$ to generate a signal informative of a curvature of the contour of the element, determine at least one of data $D_{periodicity}$ informative of a periodicity of the signal, or data $D_{discontinuities}$ informative of a number of discontinuities in the signal, wherein each discontinuity is informative of a transition between a convex portion of the contour and a concave portion of the contour, and use at least one of the data $D_{periodicity}$ or the data $D_{discontinuities}$ to determine data informative of correct manufacturing of the element.

According to some embodiments, the contour of the element has an expected shape, wherein the system is configured to use $D_{periodicity}$ to determine data informative of a similarity of the contour with a shape different from the expected shape.

According to some embodiments, the shape is a polygon.

According to some embodiments, the shape is a polygon which has a number N of vertices, wherein the higher a correspondence between the periodicity of the signal and the number N, the higher said similarity.

According to some embodiments, the system is configured to use data $D_{discontinuities}$ to generate data informative of a curliness of the contour of the element.

According to some embodiments, the signal informative of a curvature of the contour of the element is informative of variations in the curvature of the contour of the element.

According to some embodiments, the signal informative of a curvature of the contour of the element is informative of an evolution, along the contour, of a direction of a normal to the contour.

According to some embodiments, the system is configured to detect discontinuities in the signal which have an amplitude above a threshold to generate $D_{discontinuities}$.

According to some embodiments, the system is configured to use data $D_{periodicity}$ to generate a first score informative of a similarity of the contour with a first shape, a second score informative of a similarity of the contour with a second shape, wherein the second shape is different from the first shape, and an aggregated score based on the first score and the second score.

According to some embodiments, data $D_{periodicity}$ comprises a prospect $P_1$ that the periodicity is equal to a first number $N_1$, and a prospect $P_2$ that the periodicity is equal to a first number $N_2$, wherein $N_2$ is different from $N_1$.

According to some embodiments, the system is configured to use the first prospect $P_1$ to generate a first score informative of a similarity of the contour with a first shape and use the second prospect $P_2$ to generate a second score informative of a similarity of the contour with a second shape, wherein the second shape is different from the first shape.

According to some embodiments, the first shape is a polygon with a number $N_1$ of vertices, and the second shape is a polygon with a number $N_2$ of vertices.

According to some embodiments, the system is configured to determine, for each given location of a plurality of locations along the contour of the element, a normal to the contour at the given location, and a direction from the given location to a center of gravity of the element, generate data informative, for each given location, of an angular difference between the normal and the direction, and use said data to obtain the signal informative of a curvature of the contour of the element.

According to some embodiments, the system is configured to convert the signal informative of a curvature of the contour of the element into a signal in the frequency domain and use the signal in the frequency domain to determine $D_{periodicity}$.

In accordance with certain aspects of the presently disclosed subject matter, there is provided a method of examination of a semiconductor specimen, the method comprising, by a processor and memory circuitry (PMC), obtaining data $D_{contour}$ informative of a contour of an element of the semiconductor specimen acquired by an examination tool, using the data $D_{contour}$ to generate a signal informative of a curvature of the contour of the element, determining at least one of data $D_{periodicity}$ informative of a periodicity of the signal, or data $D_{discontinuities}$ informative of a number of discontinuities in the signal, wherein each discontinuity is informative of a transition between a convex portion of the contour and a concave portion of the contour, and using at least one of the data $D_{periodicity}$ or the data $D_{discontinuities}$ to determine data informative of correct manufacturing of the element.

According to some embodiments, the contour of the element has an expected shape, wherein the method comprises using $D_{periodicity}$ to determine data informative of a similarity of the contour with a shape different from the expected shape.

According to some embodiments, the shape is a polygon which has a number N of vertices, wherein the higher a correspondence between the periodicity of the signal and the number N, the higher said similarity.

According to some embodiments, the method comprises using data $D_{discontinuities}$ to generate data informative of a curliness of the contour of the element.

According to some embodiments, the method comprises determining, for each given location of a plurality of locations along the contour of the element, a normal to the contour at the given location, and a direction from the given location to a center of gravity of the element, generating data informative, for each given location, of an angular difference between the normal and the direction, and using said data to obtain the signal informative of a curvature of the contour of the element.

According to some embodiments, the method can implement one or more of the features described with reference to the system above.

In accordance with other aspects of the presently disclosed subject matter, there is provided a non-transitory computer readable medium comprising instructions that, when executed by a processor and memory circuitry (PMC), cause the PMC to perform the method above.

According to some embodiments, the proposed solution enables determining efficiently, and in a robust manner, anomalies in the manufacturing process of an element of a specimen. In particular, it can be used to stabilize the manufacturing process of the element.

According to some embodiments, the proposed solution enables determining, accurately and efficiently, to which extent a structural element is manufactured according to a shape which differs from an expected shape. In particular, according to some embodiments, data informative of the similarity of the element with the shape, is provided. The similarity of the element with one or more shapes can therefore be quantified. This enables a user to decide which corrective action should be taken with regard to the manufacturing process and/or with regard to the specimen.

According to some embodiments, the proposed solution does not require using a reference image and can operate on a single image. According to some embodiments, the proposed solution is flexible and can be adapted to various types of manufacturing processes of an element. According to some embodiments, the proposed solution offers to the user the possibility to choose one or more predetermined shapes for which a similarity between the structural element and the one or more predetermined shapes is measured.

According to some embodiments, the proposed solution enables detecting curliness and/or process variations in a contour of an element.

According to some embodiments, the proposed solution enables determining, efficiency and accurately, correct manufacturing of NAND layers.

According to some embodiments, the proposed solution is numerically efficient. In particular, it can run fast in production environments.

According to some embodiments, the proposed solution is robust.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
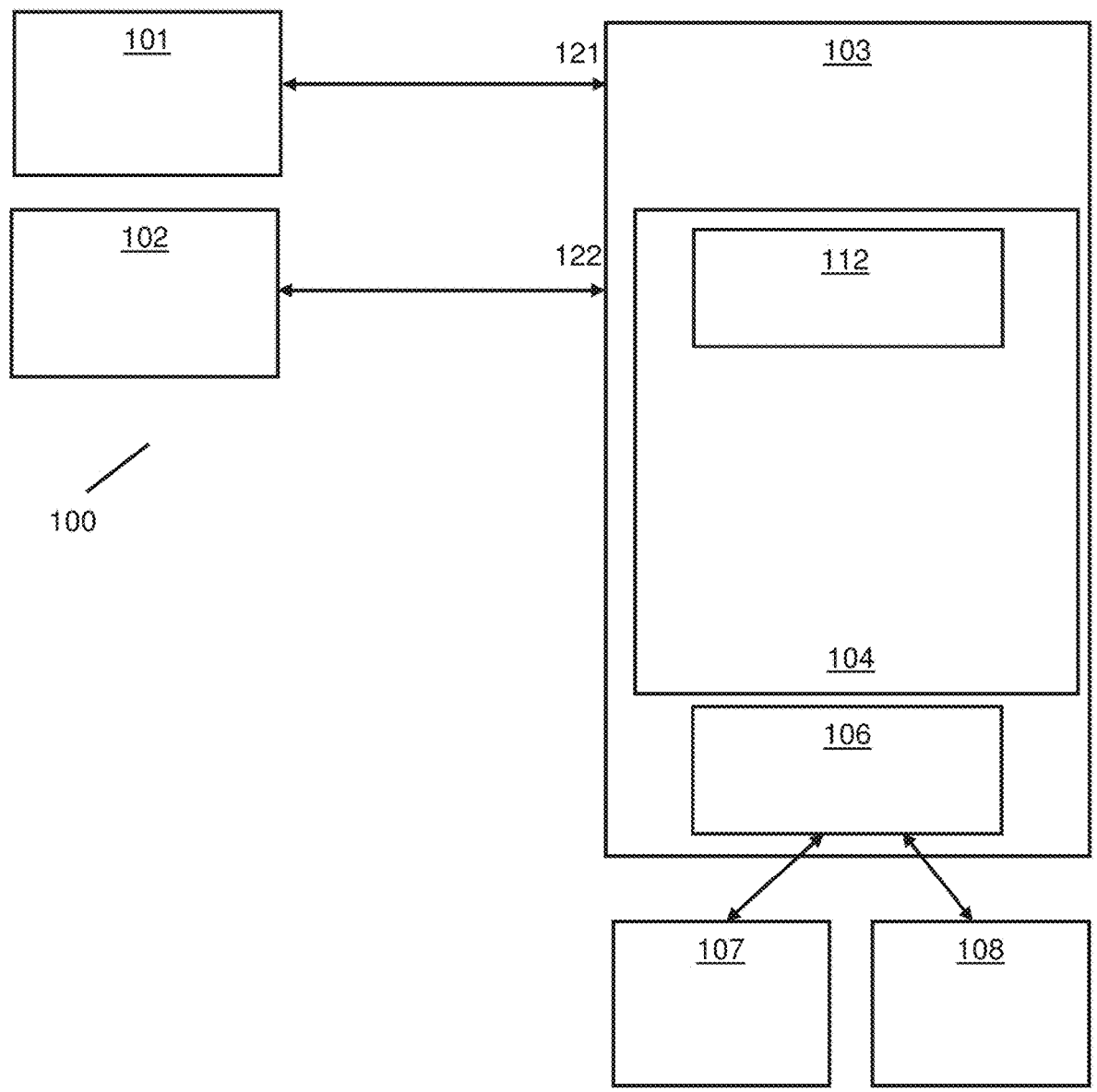
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "using", "obtaining", "determining", "generating", "detecting", "converting" or the like, refer to the action(s) and/or process(es) of computer that manipulates and/or transforms data into other data, said data represented as physical, such as electronic, quantities and/or said data representing the physical objects. The term "computer" should be expansively construed to cover any kind of hardware-based electronic device with data processing capabilities (such as a processor and memory circuitry) including, by way of non-limiting example, the system 103 and respective parts thereof disclosed in the present application.

The terms "non-transitory memory" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations, as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification, are not limited with respect to resolution or size of an inspection area. A variety of non-destructive examination tools includes, by way of non-limiting example, scanning electron microscopes, atomic force microscopes, optical inspection tools, etc.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as part of the specimen fabrication process. The illustrated examination system 100 comprises computer-based system 103 capable of automatically determining metrology-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s).

System 103 includes a processor and memory circuitry (PMC) 104. PMC 104 is configured to provide all processing necessary for operating the system 103 as further detailed hereinafter (see methods described in FIGS. 2A, 3A, 5 and 7 which can be performed at least partially by system 103) and includes a processor (not shown separately) and a memory (not shown separately).

System 103 is configured to receive input data. Input data can include data (and/or derivatives thereof and/or metadata associated therewith) produced by the examination tools. It is noted that input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen.

By way of non-limiting example, a specimen can be examined by one or more low-resolution examination machines 101 (e.g. an optical inspection system, low-resolution SEM, etc.). The resulting data (referred to hereinafter as low-resolution image data 121), informative of low-resolution images of the specimen, can be transmitted—directly or via one or more intermediate systems—to system 103. Alternatively or additionally, the specimen can be examined by a high-resolution machine 102 (e.g. a scanning electron microscope (SEM) or Atomic Force Microscopy (AFM)). The resulting data (referred to hereinafter as high-resolution image data 122) informative of high-resolution images of the specimen can be transmitted—directly or via one or more intermediate systems—to system 103. According to some embodiments, the examination machine is a Critical Dimension Scanning Electron Microscope (CD-SEM) for measuring the dimensions of the fine patterns formed on a semiconductor wafer.

It is noted that image data can be received and processed together with metadata (e.g. pixel size, text description of defect type, parameters of image capturing process, etc.) associated therewith.

Upon processing the input data (e.g. low-resolution image data and/or high-resolution image data, optionally together with other data as, for example, design data, synthetic data, etc.), system 103 can send the results to any of the examination tool(s), store the results in a storage system 107, render the results via a GUI 108 and/or send them to an external system (e.g. to a Yield Management System of a FAB).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. System 103 can be implemented as stand-alone computer(s) to be used in conjunction with the examination tools. Alternatively, the respective functions of the system can, at least partly, be integrated with one or more examination tools.

Figure 2A:
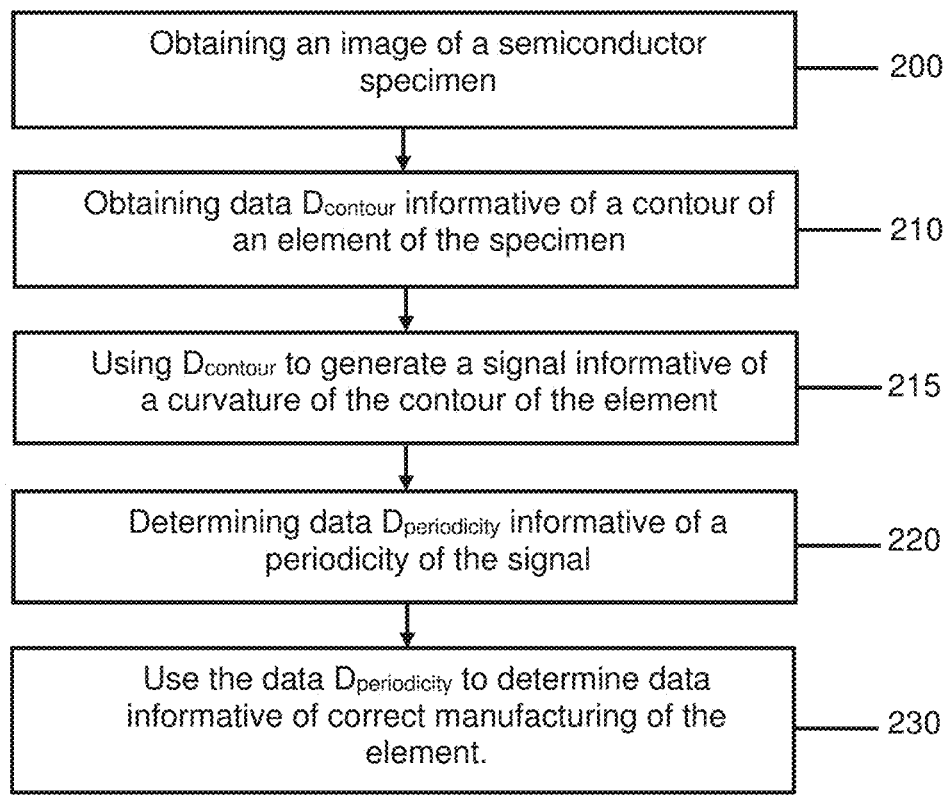
FIG. 2A illustrates a generalized flow-chart of a method of determining data informative of correct manufacturing of the element using a signal informative of a curvature of the contour of the element.

Attention is now drawn to FIG. 2A. The method includes obtaining (operation 200) an image of a semiconductor specimen. The image can be acquired by an examination tool, such as examination tool 102 and/or 103. In some embodiments, the examination tool is a metrology tool.

The specimen includes one or more elements (e.g. structural elements). Examples of elements include e.g. contacts, transistors, gates, etc. These examples are not limitative.

The method includes (operation 210) obtaining, for at least one element of the specimen present in the image, data $D_{contour}$ informative of the contour of the element. As explained hereinafter, $D_{contour}$ can be generated using the image. In some embodiments, the method comprises directly obtaining $D_{contour}$, which has been generated using an image of the specimen.

The contour corresponds e.g. to the external border of the element, which separates the element from the rest of the image. The area of the image located within the contour corresponds to the interior area of the element.

Figure 2B:
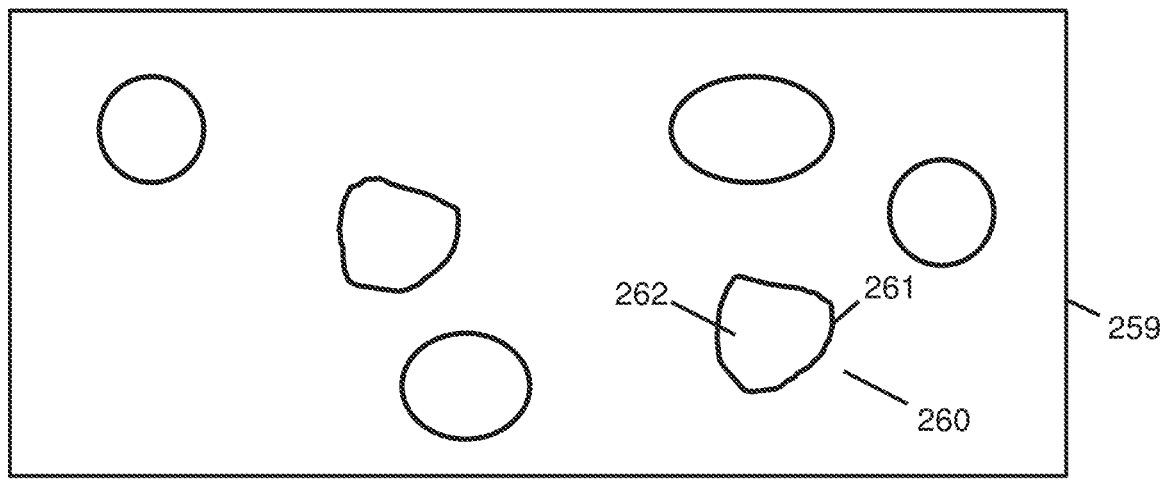
FIG. 2B illustrates a non-limitative example of an image of elements in a specimen.

FIG. 2B illustrates non-limitative examples of contacts in an image 259 of a specimen. Contact 260 comprises a contour 261 and an interior area 262 located within the contour 261.

Figure 2C:
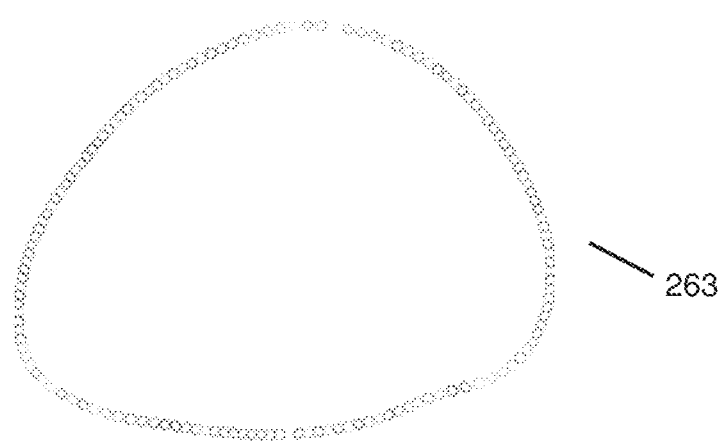
FIG. 2C illustrates a non-limitative example of a contour of an element illustrated in FIG. 2B.

$D_{contour}$ can include e.g. a list of points of the image (the points can correspond to pixels of the image and/or to points obtained using an interpolation between pixels of the image), each point being associated with a first coordinate along a first direction ("X" coordinate) in the image and a second coordinate along a second direction ("Y" coordinate) in the image. A junction between the points of the list of points corresponds to the contour of the element. A non-limitative example of $D_{contour}$ (see reference 263) obtained for element 260 is illustrated in FIG. 2C. In other embodiments, $D_{contour}$ can include a continuous line defining the profile/location of the contour of the element in a two-dimensional plane.

$D_{contour}$ can be obtained using various methods. According to some embodiments, a segmentation process can be performed on the image acquired by the examination tool. This enables to detect the different elements of the specimen present in the image. As a consequence, it is possible to determine the contour of each element.

In some embodiments, the contour of each element ($D_{contour}$) can be determined using an image processing algorithm. A library such as "OpenCV" can be used to determine contour of an element is an image. This is however not limitative.

The method of FIG. 2A further includes using (operation 215) the data $D_{contour}$ to generate a signal informative of a curvature of the contour of the element.

According to some embodiments, the curvature is defined as the amount by which the curve deviates from being a straight line. The radius of curvature at a point on a curve is the radius of a circle which best fits the curve at that point. The curvature is the inverse of the radius of curvature.

As explained hereinafter, the signal informative of the curvature of the contour of the element can correspond to the curvature itself, or to a signal informative of variations of the curvature along the contour.

Determination of the curvature of a two-dimensional shape (such as the contour of the element) can rely on known mathematical formulas. For example, the curvature at each given point can be determined using a neighbourhood of each given point, using the Pratt method (V. Pratt, "*Direct least-squares fitting of algebraic surfaces*", Computer Graphics, Vol. 21, pages 145-152 (1987)). This is not limitative and other methods can be used.

Figure 3A:
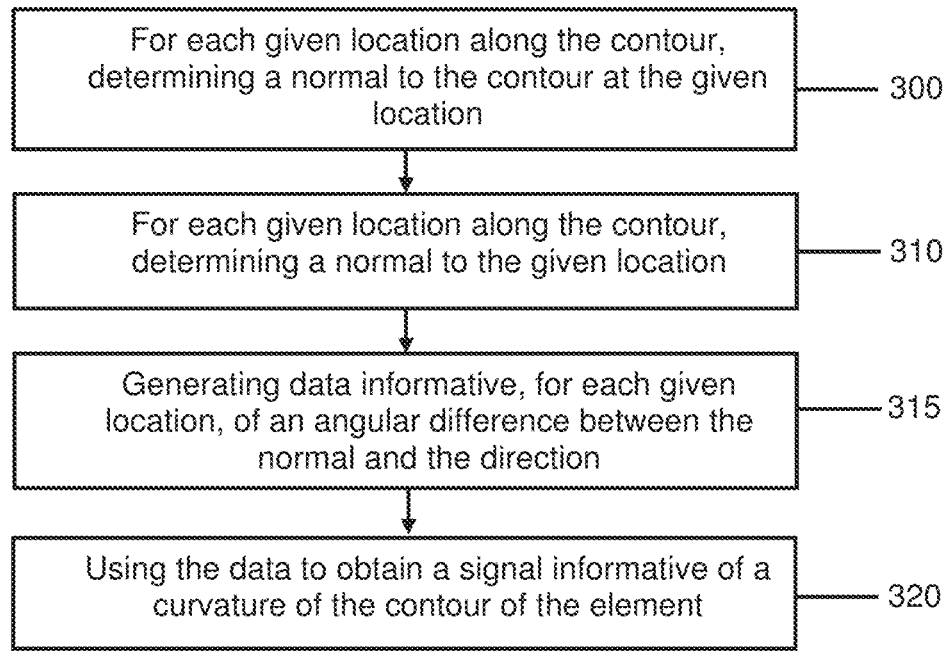
FIG. 3A illustrates a generalized flow-chart of a method of determining a signal informative of a curvature of a contour of an element.

FIG. 3A depicts another method of determining the signal informative of the curvature of the contour of the element, using $D_{contour}$.

Figure 3B:
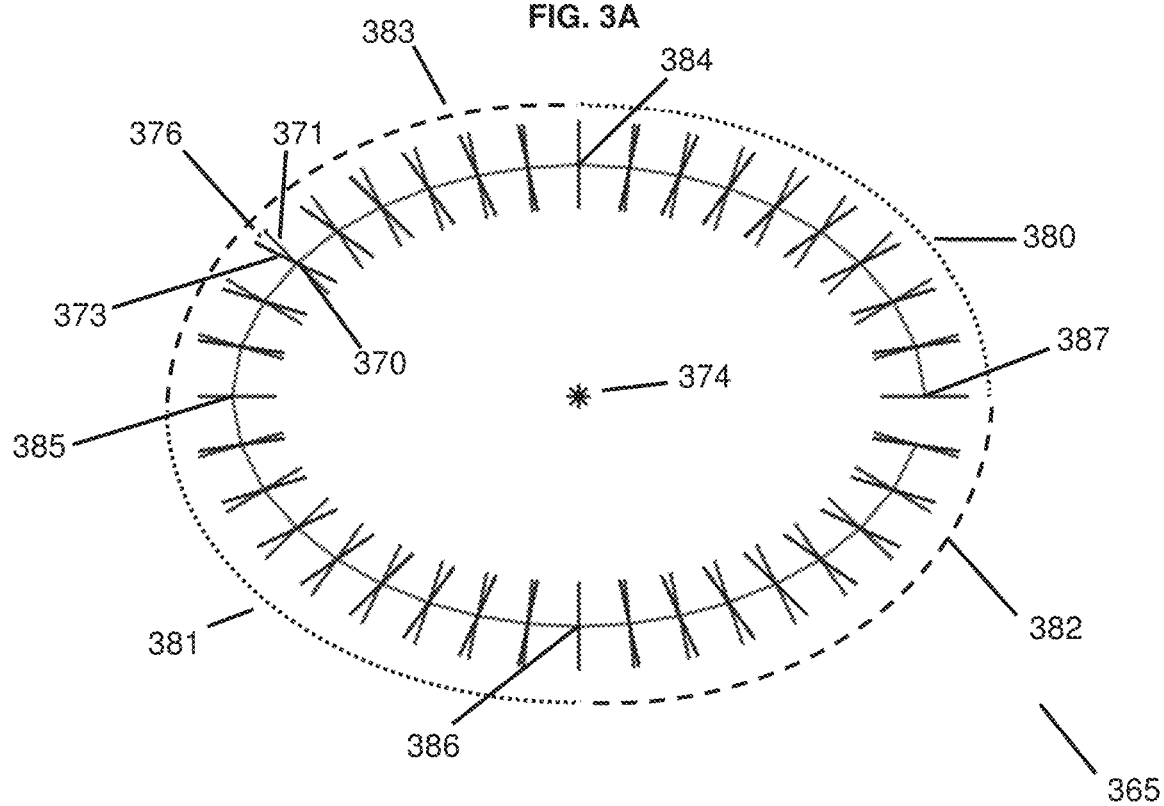
FIG. 3B illustrates a non-limitative example of a use of the method of FIG. 3A on an elliptic element.

For each given location of a plurality of locations along the contour of the element, the method of FIG. 3A includes determining (operation 300) a normal to the contour at the given location (that is to say a direction/vector which is orthogonal to the contour at the given location). A non-limitative example is illustrated in FIG. 3B. For the given location 370 located on the contour of an element 365, the normal 371 is obtained. As visible in FIG. 3B, the same process is performed for various other locations along the contour of the element 365.

The method further includes determining (operation 310), for each given location of a plurality of locations along the contour of the element, a direction from the given location to a center of gravity (also called center of mass) of the element. In the non-limitative example of FIG. 3A, for the given location 370 located on the contour of an element 365, the direction/vector 373 is obtained, which is oriented towards the center of gravity 374 of the element 365. As visible in FIG. 3A, the same process is performed for various other locations along the contour of the element 365.

The method further includes generating (option 315), for each given location along the contour, data informative of an angular difference (angular offset) between the normal and the direction towards the center of gravity. For example, at the given location 370, angle 376 is computed, which corresponds to the angular difference between the normal 371 and the direction 373. The same process is performed for various other locations along the contour of the element 365.

As a consequence, for each given location, an angular difference between the normal and the direction to the center of gravity is obtained. This enables to generate a one-dimensional signal (angular difference with respect to the position along the contour). In some embodiments, this one-dimensional signal can be rescaled (by adding or subtracting a phase of $\pi$), in order to obtain a more continuous/smoother signal. Indeed, when the value of the angular difference moves from 0 to $\pi$ (respectively from 0 to $-\pi$), it is possible to add a value of $-\pi$ (respectively $+\pi$) to the signal. Indeed, in order to determine periodicity of the curvature of the contour, it is not crucial to determine whether the normal to the contour has the same direction as the direction towards the center to the gravity (angular offset of 0) or has an opposite direction to the direction towards the center of gravity (angular offset of $+\pi$ or $-\pi$).

The signal computed using the method of FIG. 3A is informative of the curvature of the contour of the element. More particularly, this signal is informative of variations of curvature of the contour of the element. Indeed, for a perfect circle, since the normal and the direction to the center of gravity are the same, the difference is zero. As a consequence, the signal is zero, which corresponds to the fact that the curvature of the circle does not change along its contour (the curvature itself is constant along the contour of the circle). Since the signal represents the curvature variations, it can be used to detect vertices of the contour, at which it is expected to obtain large variations in the curvature. This will be explained in further detail hereinafter.

The signal obtained with the method of FIG. 3A can be used as such at operation 215 as a signal informative of the curvature of the contour of the element (see operation 320).

In the example of FIG. 3A, for the locations along the contour located in areas 380 and 381, the angular difference is expected to be high positive, for the locations along the contour located in areas 380 and 381, the angular difference is expected to be high negative, and for the locations 384, 385, 386 and 387 the angular difference is expected to be zero.

In some embodiments, the signal used at operation 215 is the evolution of the direction of the normal along the contour (this corresponds to the evolution of the angular direction of the normal, in the referential of the image). Note that in the method of FIG. 3A, the angular difference between the normal and the direction to the center of gravity is computed, and in this case, the angular direction of the normal is computed.

Figure 4:
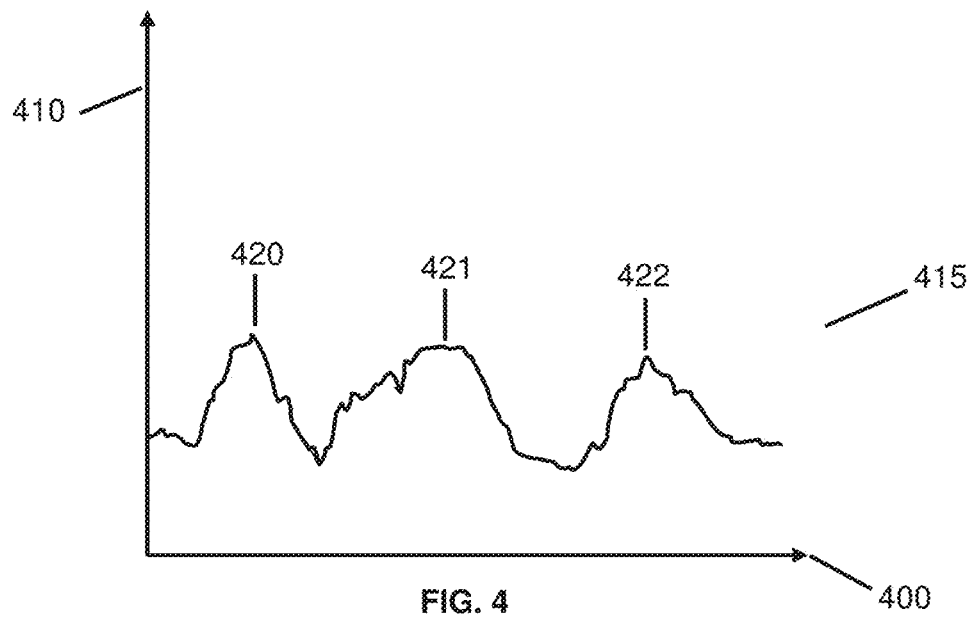
FIG. 4 illustrates a non-limitative example of a signal informative of a curvature of a contour of an element.

FIG. 4 depicts a signal 415 informative of a curvature of the element 260 associated to a contour 263 (see FIG. 2C). The graph of FIG. 4 depicts curvature in ordinate 410 with respect to the position along the contour in abscissa 400. The signal 415 has been obtained using a method of calculating the curvature itself, and not using the method of FIG. 3A. The signal 415 comprises three main peaks. Note that if the method of FIG. 3A is used, this would also lead to a signal with three main peaks, since the method of FIG. 3A provides a signal informative of the variations in the curvature.

The method of FIG. 2A further includes determining (operation 220) data $D_{periodicity}$ informative of a periodicity of the signal informative of a curvature of the contour of the element (obtained at operation 215). The periodicity of a signal is the tendency of the signal to recur at intervals. The periodicity can be assessed in the signal obtained at operation 215 and calculated over the contour.

As explained hereinafter, in some embodiments, data $D_{periodicity}$ includes, for each integer $N_i$ in a range of integers from 1 to N, a probability that the signal has a periodicity equal to $N_i$. A periodicity of $N_i$ can correspond to the fact that the signal (computed over the contour) has a tendency to repeat itself Ni times.

In some cases, the periodicity corresponds to the number of peaks of the signal informative of a curvature of the contour of the element (obtained at operation 215). The peaks correspond e.g. to the maxima of the amplitude of the signal. In some embodiments, the various peaks of the signal have similar amplitudes, or their difference in amplitude is small or neglectable relative to their difference in amplitude with respect to other portions of the signal.

In the example of FIG. 4, three main peaks 420, 421 and 422 are present in the signal 415. Therefore, $D_{periodicity}$ will indicate a high probability that the signal 415 has a periodicity of three. However, since the signal 415 is not a perfect sinusoid with only 3 peaks, then $D_{periodicity}$ will also include a probability that different values for the periodicity are present in the signal (the probability will, however, be lower than the probability associated to the periodicity equal to three).

Figure 5:
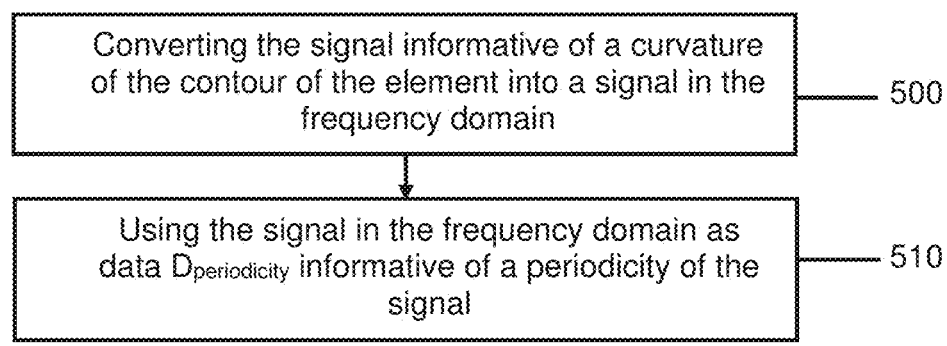
FIG. 5 illustrates a generalized flow-chart of a method of determining a number of peaks in a signal informative of a curvature of a contour of an element, using a conversion in the frequency domain.

In order to determine data $D_{periodicity}$, various methods can be used. FIG. 5 depicts a method of determining data $D_{periodicity}$ using Fourier transform. This is however not limitative and various other methods can be used. For example, a function "findpeaks" in Matlab can be used.

The method of FIG. 5 includes converting (operation 500) the signal informative of a curvature of the contour of the element into a signal in the frequency domain. According to some embodiments, a Fourier transform (e.g. Fast Fourier Transform) can be applied to the signal in order to convert it into the frequency domain.

The method further includes (operation 510) using the signal in the frequency domain as data $D_{periodicity}$ informative of a periodicity of the signal (or using the signal in the frequency domain to determine $D_{periodicity}$). Indeed, as illustrated in the various examples hereinafter, the representation of the signal in the frequency domain enables to determine the frequency components (harmonics), which, in turn, are informative of the periodicity of the signal informative of the curvature of the contour of the element.

Figure 6A:
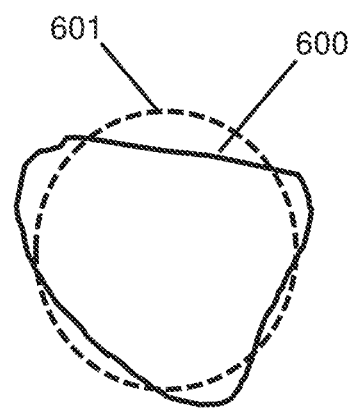
FIG. 6A illustrates a non-limitative example of a contour of an element with respect to its expected contour.

Assume that an element 600 (e.g. a contact) of the specimen has a shape in the image as visible in FIG. 6A. The element 600 has a shape which differs from the ideal/expected shape 601 (circular shape) for the manufacturing process used to manufacture element 600. Indeed, element 600 has a shape which tends more to a triangular shape than to the required circular shape.

Figure 6B:
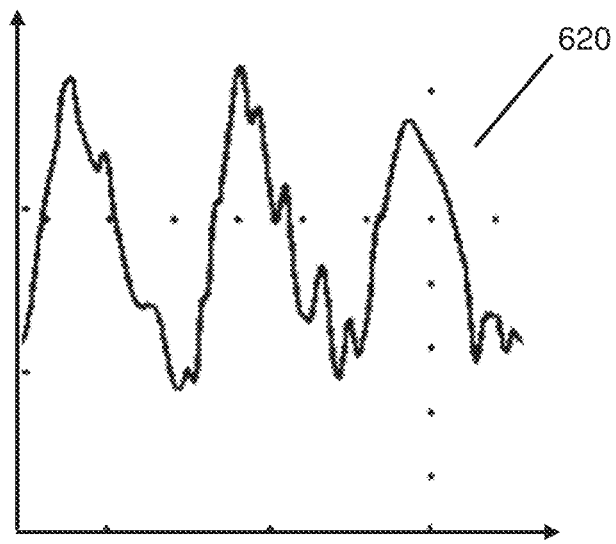
FIG. 6B illustrates a signal informative of a curvature of the contour of the element depicted in FIG. 6A.

As already explained with reference to operation 215 in FIG. 2A, a signal 620 (see FIG. 6B) informative of a curvature of the contour of the element is generated. In this non-limitative example, the method of FIG. 3A has been used to determine the signal 620.

Figure 6C:
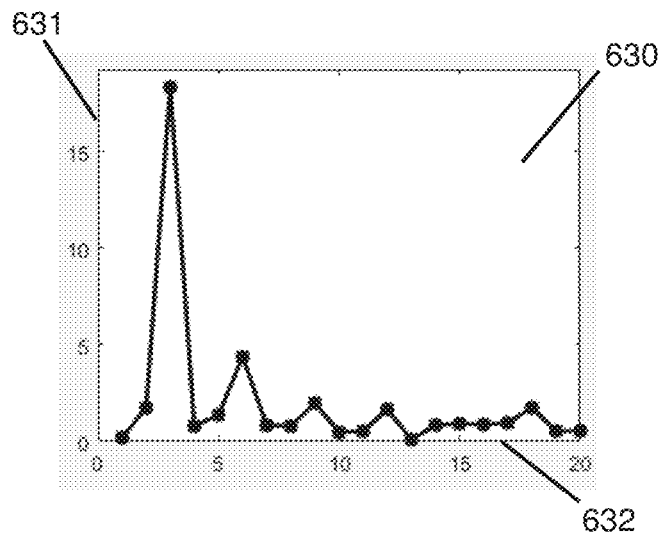
FIG. 6C illustrates a frequency representation of the signal of FIG. 6B.

In this non-limitative example, the signal 620 is converted into the frequency domain, using a FFT transformation. The frequency representation 630 is obtained (see FIG. 6C). The frequency representation 630 outputs amplitude 631 of the harmonics in the signal 620 as a function of frequency 632. In particular, the FFT representation depicts amplitude of the first harmonic ($f_1$), and each harmonic frequency ($f_n$) (with $f_n$=n.f1, in which n is the harmonic number). In the particular example of FIG. 6C, the FFT representation 630 shows a large peak for the third harmonic (n=3). Other harmonics are also present, but with a much lower amplitude. The FFT representation 630 is therefore informative of the periodicity in the signal 620. Since a large amplitude of the third harmonics (n=3) has been detected, this means that there is a high probability that the signal 620 has a periodicity equal to three. Since the signal 620 is not a perfect sinusoidal signal, other harmonics are present (n different from three), with a much lower amplitude.

Reverting to the method of FIG. 2A, the method further includes using (operation 230) the data $D_{periodicity}$ to determine to determine data informative of correct manufacturing of the element.

When a given element (e.g. a contact, a transistor, etc.) is manufactured, a manufacturing process is used. The given element is manufactured according to an expected shape. For example, for a contact, the expected shape can be a circular shape. In practice, the given element can have an actual shape which can differ from the expected shape. This can cause a degradation of the performance, such as of its electric performance.

According to some embodiments, operation 230 includes using the data $D_{periodicity}$ to determine at least one score informative of a similarity of the contour with a shape (as explained hereinafter, the shape can be a predetermined shape). In particular, according to some embodiments, the shape is different from the expected shape of the element. In other words, it can be measured and quantified to which extent the element has a shape which is similar to a shape which is different from its expected shape. Therefore, the score can be used to detect an anomaly or a problem in the manufacturing process of the element. In particular, the score can be used to detect instability/systematic defects in the manufacturing process of the element.

Indeed, if the score indicates a high similarity between the element and a predetermined shape which is different from the expected shape, this indicates that there is high probability of presence of an anomaly in the manufacturing process. As a consequence, at least one corrective action can be taken.

In the various methods described in the application, various different corrective actions can be carried out using the data informative of correct manufacturing of the element. This can include at least one of manufacturing again the element and/or the specimen, correcting one or more parameters of the manufacturing process (e.g. manufacturing frequency, temperature, one or more parameters of the manufacturing tool), discarding the specimen, selecting a process which the specimen needs to undergo, further examining the specimen, writing information to a database, etc.

The data informative of the correct manufacturing of the element can be used in particular to stabilize the manufacturing process.

As explained hereinafter, at operation 230, it can be attempted to determine a score informative of a similarity of the contour of the element with a polygon. Examples of a polygon include e.g. a triangle, a square, a rectangle, a pentagon and a hexagon. One principle which can be used at operation 230 is that a polygon has a certain number of vertices (for example, a triangle has three vertices, a square or a rectangle has four vertices, etc.). The curvature of the contour of the polygon has abrupt changes at the vertices of the polygon. Therefore, if the polygon has N vertices, it is expected that a signal informative of the curvature of the polygon will include a periodicity equal to N (both when the signal corresponds to the curvature itself, and when the signal corresponds to variations in the curvature). As mentioned above, in some examples, this can correspond to N peaks. Since the method of FIG. 2A enables to determine data $D_{periodicity}$ informative of the periodicity in the signal informative of the curvature of the contour of the element, it can be deduced from $D_{periodicity}$ a prospect informative of a similarity of the contour with a polygon of N vertices. More generally, according to some embodiments, $D_{periodicity}$ can be used to determine, for each integer $N_i$ in a range $[N_{min}; N_{max}]$, a corresponding score $S_i$ indicative of a similarity between the contour of the element and a predetermined shape which has $N_i$ vertices. Therefore, a first score can indicate similarity between the contour and a triangle. A second score can indicate similarity between the contour and a square or rectangle. A third score can indicate similarity between the contour and a pentagon. In some embodiments, an aggregated score can be generated, based on one or more of the scores $S_i$.

An example of operation 230 is illustrated with reference to FIG. 6D. Assume that it is attempted to determine at least one score informative of a similarity of the contour of the element 600 with a triangle.

Since the FFT representation 630 of the signal 620 includes a large amplitude for the harmonic $f_3$ ($f_3$=3. $f_1$, with $f_1$ the first harmonic), a corresponding score is computed which indicates a high similarity between the element 600 and a triangle. In some embodiments, the score can be scaled into a scale between 0 and 100. The conversion of the amplitude obtained in the FFT representation into a score between 0 and 100 can be performed using a conversion factor. The conversion factor can be determined e.g. empirically. To the contrary, the FFT representation 630 of the signal 620 includes a low amplitude for the harmonic $f_4$ ($f_4$=3. $f_1$, with $f_1$ the first harmonic), and therefore a score indicative of a similarity with a square is low.

Figure 6D:
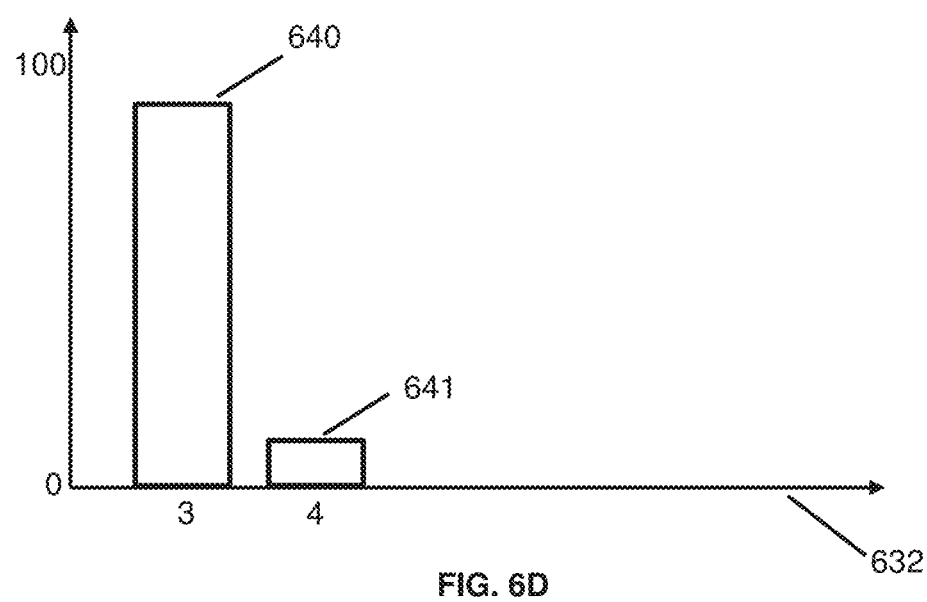
FIG. 6D illustrates probabilities indicative of a similarity of the element of FIG. 6A with different polygons.

In the example of FIG. 6D, the score 640 (called hereinafter "triangularity") which indicates similarity of the contour of the element 600 with a triangle is 92, and the score 641 (called hereinafter "squareness") which indicates similarity of the contour of the element 600 with a square is 8. In some embodiments, an aggregated score can be computed, and provided to the user. For example, the following non-limitative formula can be used:

Aggregated Score=Max (triangularity, 0.5*squareness)

Note that the similarity of the contour of the element with a pentagon can be deduced from the amplitude obtained in the FFT representation for the 5th harmonic ($f_5$=5.f1). As explained above, this amplitude can be converted into a score located in a predefined scale, using a conversion factor. Similarly, the similarity of the contour of the element with a hexagon can be deduced from the amplitude obtained in the FFT representation for the 6th harmonic ($f_6$=6. $f_1$). An aggregated score can be computed using one or more of the scores obtained for each polygon.

According to some embodiments, the operator of the manufacturing process noted that anomalies in the manufacturing process tend to generate an element with a contour which tends to be a predefined polygon (e.g. a triangle), which differs from the expected shape (e.g. a circle). Therefore, the operator would aim to obtain a score indicative of a similarity of the element with a triangle. This is, however, not limitative.

Figure 6E:
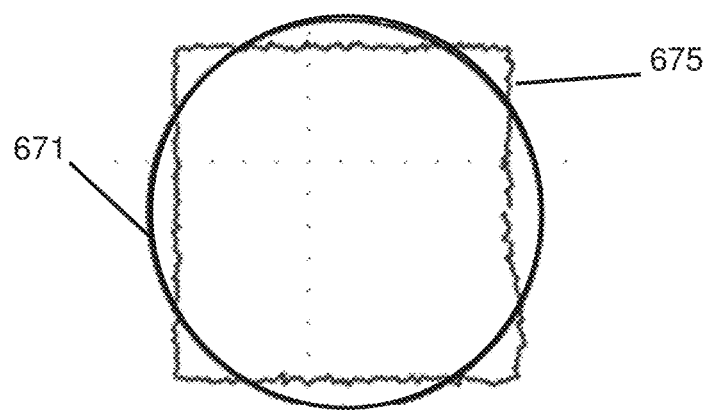
FIG. 6E illustrates a non-limitative example of a contour of an element with respect to its expected contour.

Attention is drawn to FIG. 6E. Assume that an element (e.g. a contact) of the specimen has a shape 675 in the image, as visible in FIG. 6E. The element has a shape which differs from the ideal/expected shape 671 (circular shape) for the manufacturing process used to manufacture element. Indeed, the element has a shape which tends to be a squared shape 675, rather than the required circular shape 671.

Figure 6F:
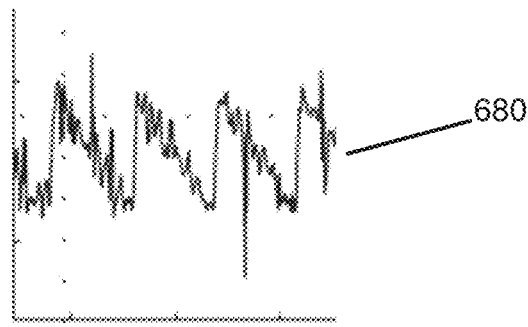
FIG. 6F illustrates a signal informative of a curvature of the contour of the element depicted in FIG. 6E.

As already explained with reference to operation 215 in FIG. 2A, a signal 680 (see FIG. 6F) informative of a curvature of the contour of the element is generated. In this non-limitative example, the method of FIG. 3A has been used to determine the signal 680.

Figure 6G:
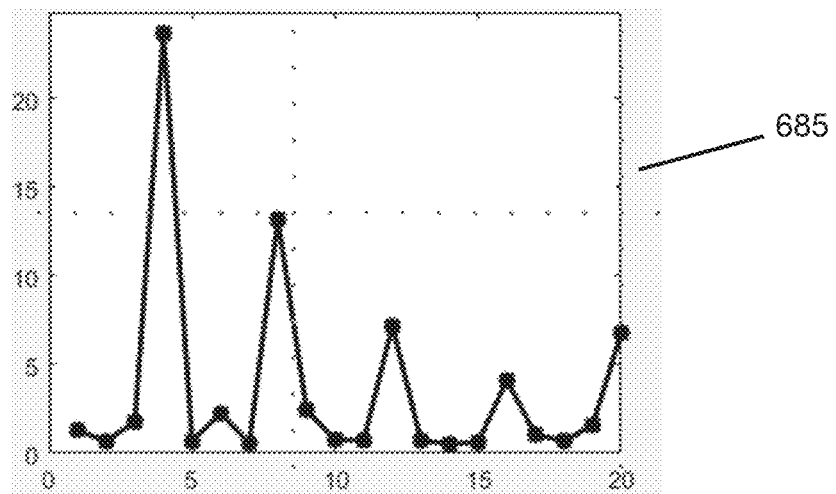
FIG. 6G illustrates a frequency representation of the signal of FIG. 6F.

In this non-limitative example, the signal 680 is converted into the frequency domain, using a FFT transformation. The frequency representation 685 is obtained (see FIG. 6G). The FFT representation 685 shows a large peak for the fourth harmonic (n=4). Other harmonics are also present, but with a much lower amplitude. Since a large amplitude of the fourth harmonics (n=4) has been detected, this means that there is a high probability that the signal 680 has a periodicity of four. Other harmonics are present (n different from four)—with a much lower amplitude.

Figure 6H:
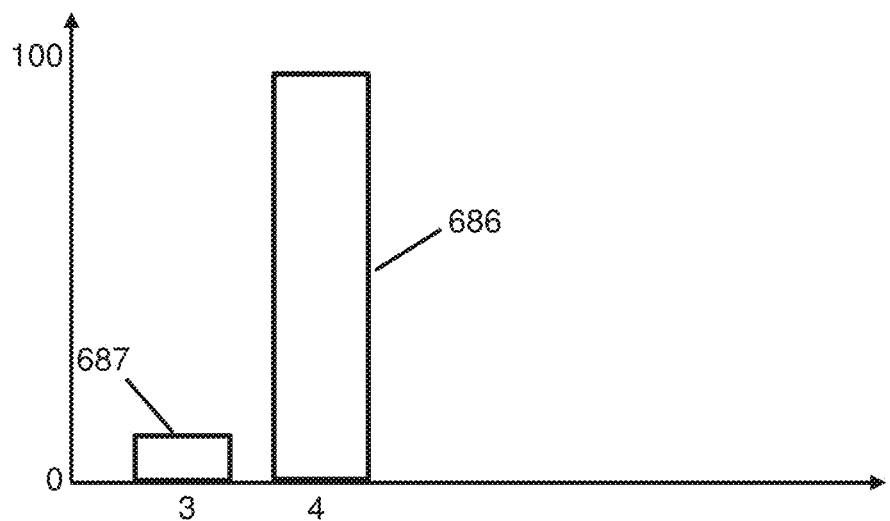
FIG. 6H illustrates probabilities indicative of a similarity of the element of FIG. 6E with different polygons.

In the example of FIG. 6H, the score 686 ("squareness") which indicates similarity of the contour of the element 671 with a square is close to 100, and the score 687 (called hereinafter "triangularity") which indicates similarity of the contour of the element 671 with a square, is low. In some embodiments, an aggregated score can be computed, and provided to the user, as explained above.

Figure 7:
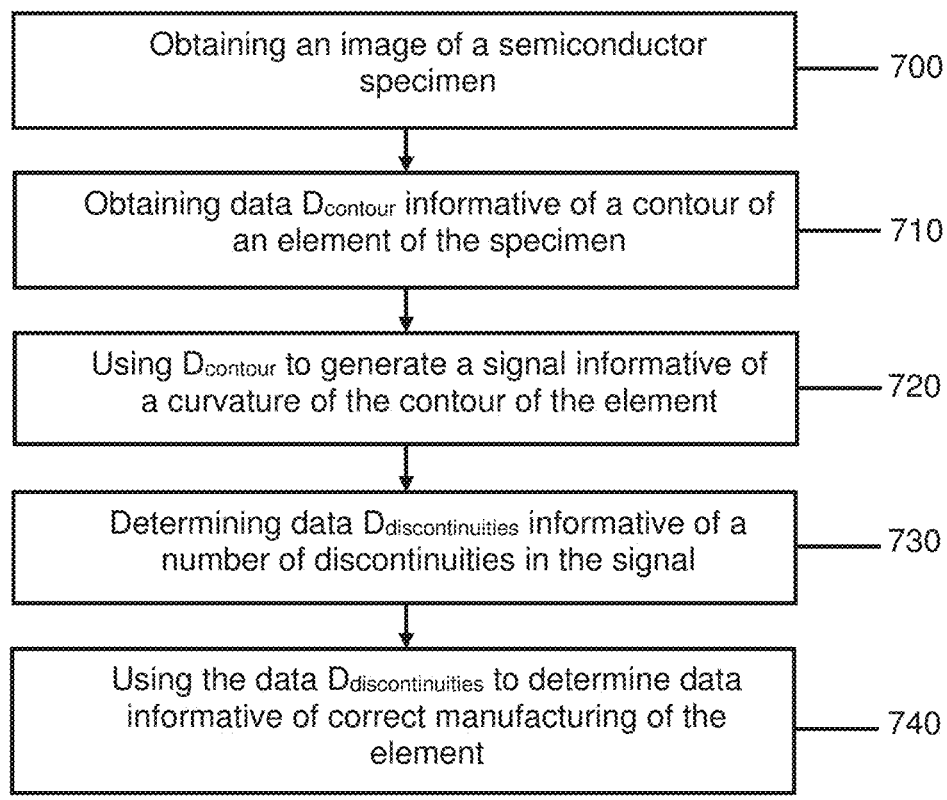
FIG. 7 illustrates a generalized flow-chart of a method of determining correct manufacturing of an element using a number of discontinuities in a signal informative of a curvature of a contour of an element.

Attention is now drawn to FIG. 7.

The method of FIG. 7 includes obtaining an image of a semiconductor specimen (operation 700, similar to operation 200) and obtaining data $D_{contour}$ informative of a contour of an element of the specimen (operation 710, similar to operation 210). The method further includes (operation 720) using $D_{contour}$ to generate a signal informative of a curvature of the contour of the element. According to some embodiments, the signal can be informative of variations in the curvature of the contour of the element. In particular, the method as described in FIG. 3A can be used.

Figure 8A:
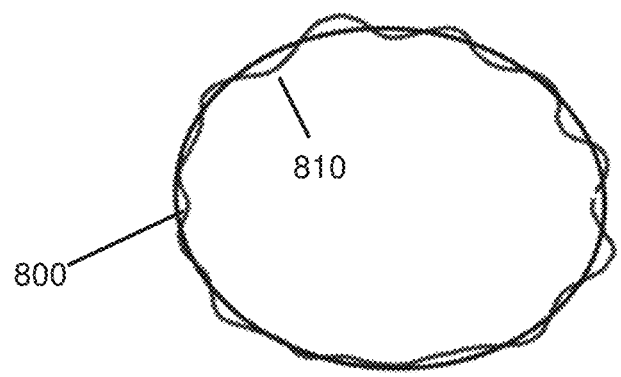
FIG. 8A illustrates a non-limitative example of a contour of an element with respect to its expected contour.

An example is provided with reference to FIG. 8A, which depicts the expected contour 800 of an element (e.g. a contact) and the actual shape of the contour 810 of the element as manufactured. As shown, the actual shape of the contour differs from the expected contour in that it is "curly". As explained hereinafter, the method of FIG. 7 enables to characterize correct manufacturing of the element, and, in particular, provides data informative of the curliness (this includes e.g. striations) of the contour of the element.

Figure 8B:
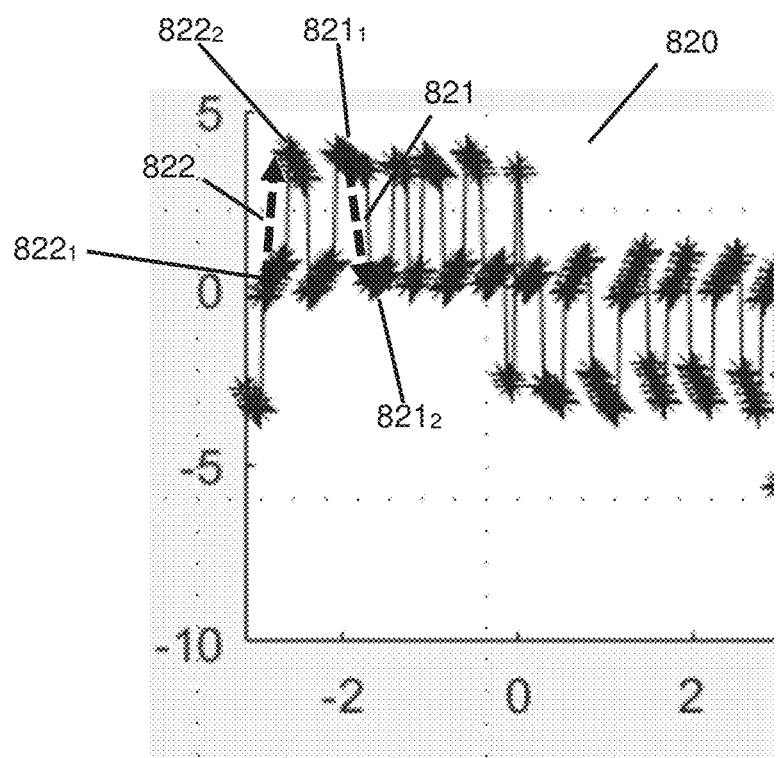
FIG. 8B illustrates a signal informative of a curvature of the contour of the element depicted in FIG. 8A.

FIG. 8B depicts a signal 820 informative of the variations of the curvature of the curly contour 810 of the element, obtained using the method of FIG. 3A. This signal has not been rescaled and discontinuities are present in this signal, as explained hereinafter.

Figure 8C:
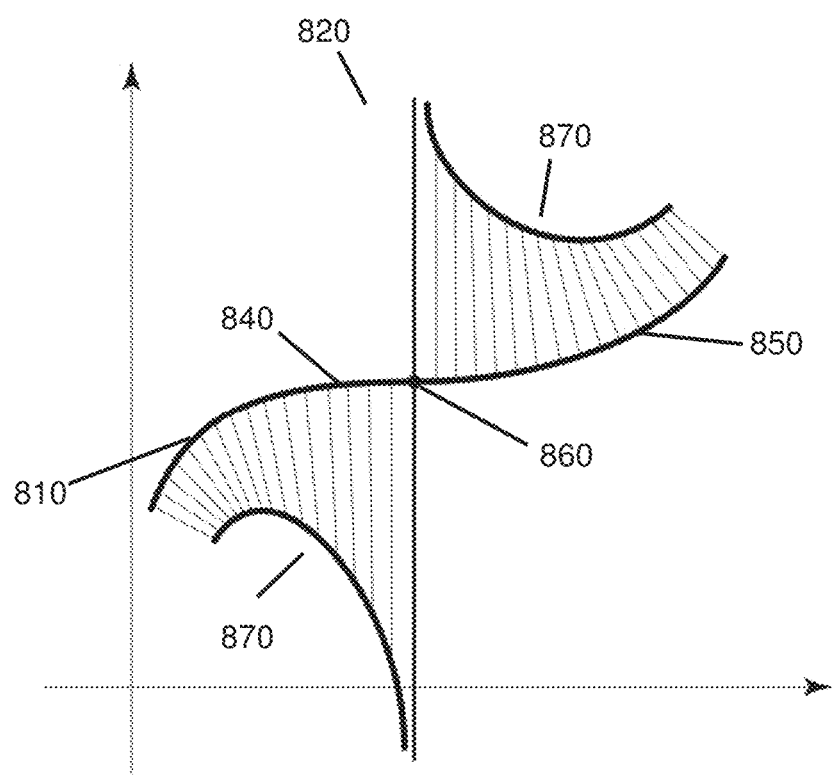
FIG. 8C illustrates a discontinuity in a signal informative of the normal to the contour, the discontinuity being informative of a transition between a convex portion and a concave portion in the contour of the element.

FIG. 8C explains the link between the curly contour 810 and this alternance between maximal amplitude and minimal amplitude in the signal 820 informative of the curvature of the contour of the element. In FIG. 8C, a portion 830 of the contour 810 is depicted (in a two-dimensional representation with abscissa corresponding to the "X" direction and the ordinate corresponding to the "Y" direction, as in the image). The portion comprises a first portion 840 which is convex, and a second portion 850 which is concave. An inflection point 860 is present between the first portion 840 and the second portion 850. Due to the curliness in the contour 810, this alternance between a concave portion and a convex portion is repeated over the contour 810.

Curve 870 in FIG. 8C corresponds to the evolution of the envelope of the normal to the contour along a portion of the contour 810 (in a two-dimensional representation X/Y). This curve 870 is also called "evolute". As visible in FIG. 8B, when the contour 810 switches from its convex portion 840 to its concave portion 850 (that is to say at inflection point 860 which corresponds to a flat portion), there is a jump (discontinuity) between a minimal negative value of the curve 870 (e.g. the normal has a direction of −180 degrees/−π, with a large length corresponding to a high value for the radius of curvature) to a maximal positive value of the curve 870 (e.g. the normal has a direction of +180 degrees/+π, with a large length corresponding to a high value for the radius of curvature). Indeed, as already mentioned above, the curvature at a given point is one over the radius of a fitted circle at this given point of the contour. When the curvature is close to zero, the radius of the fitted circle approaches infinity. This means that the curve is almost a straight line. At the inflection point 860, the direction of the normal to the contour flips, and therefore, the curve 870 switches from a minimal negative value to a maximal positive value.

This transition between convex and concave portions can be detected in the signal 820 informative of the variations of the curvature of the curly contour 810 of the element. Indeed, when there is a switch between a convex portion of the contour and a concave portion of the contour, a discontinuity is present in the signal 820. For example, in FIG. 8B, there is a discontinuity (represented by arrow 822) between a first cluster of points $822_1$ and a second cluster of points $822_2$. Similarly, there is a discontinuity (represented by arrow 821) between a third cluster of points $821_1$ and a fourth cluster of points $821_2$. Note that the signal 820 is a discrete signal and that the vertical lines (e.g. between the cluster of points $822_1$ and the cluster of points $822_2$) do not correspond to real points of the signal 820 (only the stars correspond to real points of the signal 820).

A discontinuity in the signal can be identified as corresponding to a transition between a convex portion of the contour and a concave portion of the contour (from convex to concave or from concave to convex) when this discontinuity has an amplitude which is above a threshold. As can be visible in FIG. 8B, the threshold can be defined as close to π. This can be understood from FIG. 8C, in which the direction of the normal switches from 0 to +π or −π (or conversely). Since there is a discontinuity in the angular direction of the normal, a similar discontinuity is present in the signal 820 (which corresponds to the angular offset between the normal and the direction towards the center of gravity). The discontinuity in the real signal 820 of FIG. 8B can be smaller than π due to the presence of noise and due to the fact that the signal 820 is a discrete signal.

The signal 820 includes, in an alternative order, a cluster of points (without discontinuity above a threshold) and a discontinuity (above a threshold), and then another cluster of points (without discontinuity above a threshold).

The discontinuities can be determined using various methods. In some embodiments, the difference between successive points (or between cluster of points) of the signal is calculated. When this difference is above the threshold, a discontinuity is detected.

In some embodiments, the discrete derivative of the signal 820 is determined. When this derivative is above a threshold, a discontinuity is detected. The threshold can be set manually by an operator.

Using the principles outlined above, the method of FIG. 7 further comprises (operation 730) determining data $D_{discontinuities}$ informative of a number of discontinuities in the signal, wherein each discontinuity is informative of a transition between a convex portion of the contour and a concave portion of the contour (from convex to concave or from concave to convex).

In some embodiments, since for each curly portion there is a first transition from a first convex portion to a first concave portion, and then a second transition from the first concave portion to a second convex portion, it possible to divide the number of discontinuities by two to determine the number of curly portions.

In other embodiments, it is possible to count only the discontinuities in which the amplitude of the signal 820 is increased between a first cluster of points and a second cluster of points.

In other embodiments, it is possible to count only the discontinuities in which the amplitude of the signal 820 is decreased between a first cluster of points and a second cluster of points.

As can be understood from the examples above, data $D_{discontinuities}$ is informative of correct manufacturing of the element (see operation 740), and, in particular, provides indication on a curliness and/or process variations in the contour of the element. If the number of discontinuities is above a threshold this can be indicative of a curly contour which requires a corrective action (this is not limitative). For example, if nine to twelve discontinuities are identified, this can be indicative of a curly contour which requires a corrective action (this is not limitative). As a consequence, it is possible to detect anomalies in the manufacturing process of the element, and therefore to carry out corrective actions (see various examples of corrective actions described above), e.g. for stabilizing the manufacturing process.

According to some embodiments, the signal informative of a curvature of the contour of the element used in the method of FIG. 7 corresponds to the evolution of the angular direction of the normal to the contour. This angular direction can be expressed in the referential of the image (X/Y). Discontinuities (which have an amplitude above a threshold, such as close to π) can be detected in this signal to detect a transition between a convex portion and a concave portion of the contour (or conversely). The features described with reference to FIG. 7 can be used similarly when using the angular direction of the normal to the contour.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising at least one processor and memory circuitry (PMC) configured to:
    obtain data $D_{contour}$ informative of a contour of an element of a semiconductor specimen acquired by an examination tool,
    use the data $D_{contour}$ to determine, for each given location of a plurality of locations along the contour of the element, a normal to the contour at the given location and a direction from the given location to a center of gravity of the element,
    generate data informative, for each given location, of an angular difference between the normal and the direction,
    use said data to obtain a signal informative of a curvature of the contour of the element,
    determine data $D_{periodicity}$ informative of a periodicity of the signal, and
    cause, using the data $D_{periodicity}$, performance of a corrective action to a manufacturing process associated with manufacturing of the element.

2. The system of claim 1, wherein the contour of the element has an expected shape, wherein the system is configured to use $D_{periodicity}$ to determine data informative of a similarity of the contour with a shape different from the expected shape.

3. The system of claim 2, wherein the shape is a polygon.

4. The system of claim 2, wherein the shape is a polygon which has a number N of vertices, wherein the system is configured to determine the data informative of the similarity such that the higher a correspondence between the periodicity of the signal and the number N, the higher said similarity.

5. The system of claim 1, wherein the signal informative of a curvature of the contour of the element is informative of variations in the curvature of the contour of the element.

6. The system of claim 1, wherein the signal informative of a curvature of the contour of the element is informative of an evolution, along the contour, of a direction of a normal to the contour.

7. The system of claim 1, configured to use data $D_{periodicity}$ to generate:
    a first score informative of a similarity of the contour with a first shape,
    a second score informative of a similarity of the contour with a second shape, wherein the second shape is different from the first shape, and
    an aggregated score based on the first score and the second score.

8. The system of claim 1, wherein data $D_{periodicity}$ comprises:
    a prospect $P_1$ that the periodicity is equal to a first number $N_1$, and
    a prospect $P_2$ that the periodicity is equal to a first number $N_2$, wherein $N_2$ is different from $N_1$.

9. The system of claim 8, configured to:
    use the first prospect $P_1$ to generate a first score informative of a similarity of the contour with a first shape, and
    use the second prospect $P_2$ to generate a second score informative of a similarity of the contour with a second shape, wherein the second shape is different from the first shape.

10. The system of claim 9, wherein:
    the first shape is a polygon with a number $N_1$ of vertices, and
    the second shape is a polygon with a number $N_2$ of vertices.

11. The system of claim 1, configured to:
    convert the signal informative of a curvature of the contour of the element into a signal in the frequency domain, and
    use the signal in the frequency domain to determine $D_{periodicity}$.

12. The system of claim 1, wherein the at least one PMC is further configured to:
    determine data $D_{discontinuities}$ informative of a number of discontinuities in the signal, wherein each discontinuity is informative of a transition between a convex portion of the contour and a concave portion of the contour, and wherein the data informative of correct manufacturing of the element is further determined in view of the data $D_{discontinuities}$.

13. The system of claim 12, configured to use the data $D_{discontinuities}$ to generate data informative of a curliness of the contour of the element.

14. The system of claim 12, configured to detect discontinuities in the signal which have an amplitude above a threshold to generate $D_{discontinuities}$.

15. A method comprising, by at least one processor and memory circuitry (PMC):
    obtaining data $D_{contour}$ informative of a contour of an element of a semiconductor specimen acquired by an examination tool,
    using the data $D_{contour}$ to determine, for each given location of a plurality of locations along the contour of the element, a normal to the contour at the given location and a direction from the given location to a center of gravity of the element,
    generating data informative, for each given location, of an angular difference between the normal and the direction,
    using said data to obtain a signal informative of a curvature of the contour of the element, determining data $D_{periodicity}$ informative of a periodicity of the signal, and causing, using the data $D_{periodicity}$, performance of a corrective action to a manufacturing process associated with determine data informative of correct manufacturing of the element.

16. The method of claim 15, wherein the contour of the element has an expected shape, wherein the method comprises using $D_{periodicity}$ to determine data informative of a similarity of the contour with a shape different from the expected shape.

17. The method of claim 16, wherein the shape is a polygon which has a number N of vertices, wherein the method comprises determining the data informative of the similarity such that the higher a correspondence between the periodicity of the signal and the number N, the higher said similarity.

18. The method of claim 15, further comprising, by the at least one PMC:

determining data $D_{discontinuities}$ informative of a number of discontinuities in the signal, wherein each discontinuity is informative of a transition between a convex portion of the contour and a concave portion of the contour, and wherein the data informative of correct manufacturing of the element is further determined in view of the data $D_{discontinuities}$.

19. The method of claim 18, comprising using the data $D_{discontinuities}$ to generate data informative of a curliness of the contour of the element.

20. A non-transitory computer readable medium comprising instructions that, when executed by at least one processor and memory circuitry (PMC), cause the at least one PMC to perform:

obtaining data $D_{contour}$ informative of a contour of an element of the semiconductor specimen acquired by an examination tool, using the data $D_{contour}$ to determine, for each given location of a plurality of locations along the contour of the element, a normal to the contour at the given location and a direction from the given location to a center of gravity of the element, generating data informative, for each given location, of an angular difference between the normal and the direction, using said data to obtain a signal informative of a curvature of the contour of the element, determining data $D_{periodicity}$ informative of a periodicity of the signal, and causing, using the data $D_{periodicity}$, performance of a corrective action to a manufacturing process associated with determine data informative of correct manufacturing of the element.

* * * * *